United States Patent [19]

Bakker

[11] Patent Number: 4,663,836

[45] Date of Patent: * May 12, 1987

[54] METHOD OF MANUFACTURING A MAGNETIC HEAD

[75] Inventor: Jan Bakker, Heerlen, Netherlands

[73] Assignee: U.S. Philips Corporation, New York, N.Y.

[*] Notice: The portion of the term of this patent subsequent to Jan. 15, 2001 has been disclaimed.

[21] Appl. No.: 780,713

[22] Filed: Sep. 26, 1985

Related U.S. Application Data

[60] Continuation of Ser. No. 648,852, Sep. 7, 1984, abandoned, which is a division of Ser. No. 323,618, Nov. 20, 1981, Pat. No. 4,494,160.

[30] Foreign Application Priority Data

Dec. 11, 1980 [NL] Netherlands ................ 8006715

[51] Int. Cl.$^4$ .................... G11B 5/42; G11B 5/11
[52] U.S. Cl. ........................... 29/603; 360/129
[58] Field of Search ............... 360/110, 118, 120–122, 360/125, 126, 128, 129; 29/603

[56] References Cited

U.S. PATENT DOCUMENTS

| | | | |
|---|---|---|---|
| 3,521,006 | 7/1970 | Michael | 360/129 |
| 3,564,153 | 2/1971 | Kronfeld | 360/129 |
| 3,590,168 | 6/1971 | Gooch | 360/129 |
| 3,913,221 | 10/1975 | Muraoka et al. | 29/603 |
| 4,176,384 | 11/1979 | Yang | 360/118 |
| 4,251,297 | 2/1981 | Kawabata | 29/603 |
| 4,291,354 | 9/1981 | Chase | 360/121 |
| 4,424,542 | 1/1984 | Ujihara et al. | 360/121 |

FOREIGN PATENT DOCUMENTS

| | | | |
|---|---|---|---|
| 54-133311 | 10/1979 | Japan | 29/603 |
| 55-12593 | 1/1980 | Japan | 29/603 |

OTHER PUBLICATIONS

Kehr et al., "Making Electromagnetic Shields Including Ferrite," IBM Tech. Disc. Bull., vol. 15, No. 8, Jan., 1973.

Primary Examiner—Stuart N. Hecker
Assistant Examiner—Benjamin E. Urcia

[57] ABSTRACT

A method of manufacturing a multitrack magnetic head, including positioning and securing sets of core parts on major portions of base plates, arranging the base plates such that sets of core parts face each other, placing a screening plate between and transverse to the major portions, pressing the major portions against the screening plate, and then securing the major portions directly to the screening plate while maintaining the major portions under pressure.

9 Claims, 10 Drawing Figures

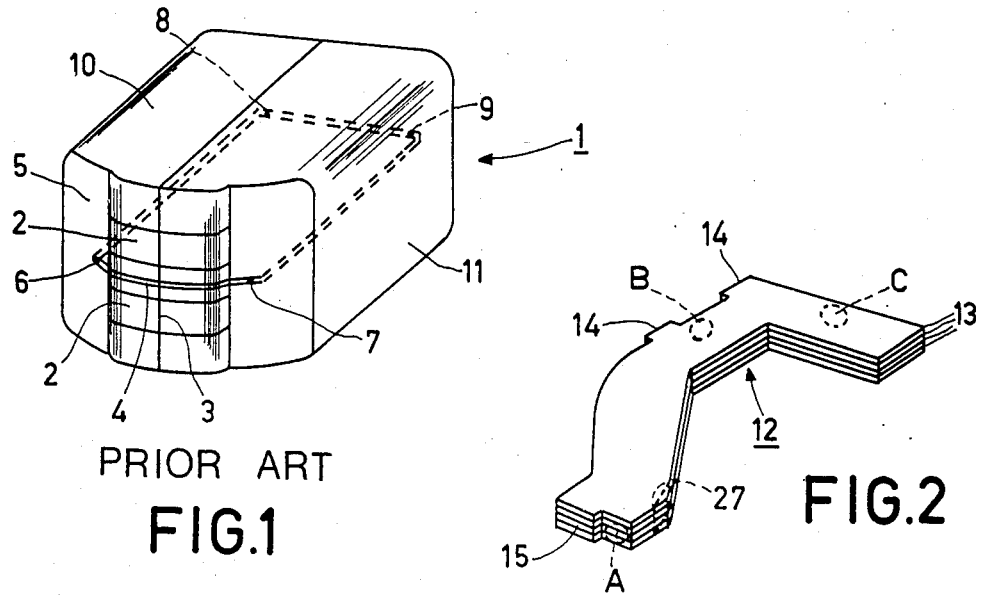
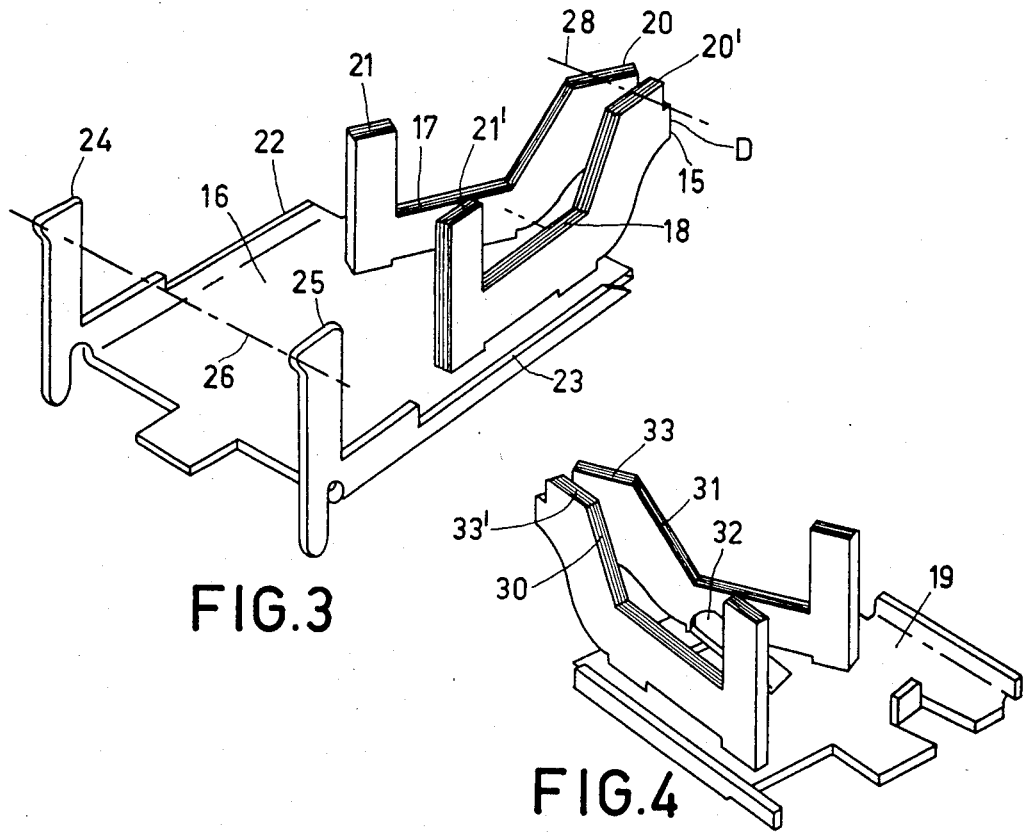
PRIOR ART
FIG.1
FIG.2
FIG.3
FIG.4

METHOD OF MANUFACTURING A MAGNETIC HEAD

This is a continuation of application Ser. No. 648,852, filed Sept. 7, 1984, abandoned, which is a division of Ser. No. 323,618, filed Nov. 20, 1981, now U.S. Pat. No. 4,494,160.

BACKGROUND OF THE INVENTION

The present invention relates to a multitrack magnetic head having a first magnet core which comprises first and second core parts which define a first transducing gap and having a second magnet core which is arranged adjacent to the first magnet core and which comprises third and fourth core parts which define a second transducing gap, the first and the third core parts being supported by a first metal core support, and the second and fourth core parts being supported by a second metal core support, the first and second core supports being rigidly connected together, a metal screening plate being present between the first and the second magnet cores.

Such a magnetic head is shown in German Offenlegungsschrift 1,902,103. In the magnetic head construction described in said Offenlegungsschrift, the screening plate is spot-welded to the core supports on each side of the tape contact face of the magnetic head. Each core support each consists of a box half having four upright sides which engage each other with the edges of their upright sides to form a closed box. A disadvantage of this construction is that it is difficult to keep the length of the transducing gap accurately at the desired small value when connecting the box halves together and during the welding of the screening plate to the box halves. Moreover, special measures must be taken to ensure that the welding spots do not disturb the tape contact face.

Another more general problem is that the previously known magnetic head designs, including the above-mentioned one, are not very suitable for automatic assembly.

SUMMARY OF THE INVENTION

It is an object of the present invention to provide a magnetic head construction which is suitable for automatic assembly. The invention provides a multitrack magnetic head as described in the opening paragraph characterized in that each of the first and second core supports comprises a substantially flat base plate on which the respective core parts are rigidly secured and that the base plates are secured (e.g. welded) to two opposite edges of the screening plate.

The magnetic head construction according to the invention avoids the welding spots on the side of the head carrying the tape contact face because a wide screening plate is used and because the core supports are welded to opposite edges of the screening plate, the opposite edges being welded to faces of the head other than the tape contact face. Moreover, the use of flat base plates in combination with a screening plate which engages the base plates during welding enables the dimensions of the screening plate to determine the transducing gap. Use may be made of a resilient lug which extends inwardly from the plane of one of the base plates and against which the screening plate engages to fix the gap length. This enables automation of the assembly.

To enable the production of an accurately defined engagement of the screening plate against the base plates, the screening plate may be welded to the base plates via engaging surfaces. These surfaces may be formed, for example, at the screening plate by providing recesses at the edges thereof.

Laser welding, electron beam welding or plasma welding may be used. The advantage of these welding processes in connecting head components together is that no mechanical load, such as occurs by applying the electrodes in spot welding, is produced and, thus, the danger of the components moving relative to each other is reduced. Using these welding, techniques, sufficient energy can be applied so that sufficient material is melted and welded together in a short time without harmful heating of the magnetic head components.

The use of core supports which consist essentially of flat base plates, to which flat plates the (soft magnetic) screening plate is welded (this latter can be done particularly readily when the base plates are of Cr-Ni steel), enables the core parts to be welded to the base plates at a previous stage of the manufacturing process. The accurate positioning of the core parts (track location) with the gap faces in one plane may be achieved by the use of a welding jig which can be aligned on a reference plane provided on the base plates so that the accuracy is no longer dependent on the tolerance spreads in the dimensions of the components to be combined. In the known magnetic head constructions, the core parts are usually assembled in slots in the box halves and after assembly fixed by an adhesive. The magnetic head construction according to the invention provides an important step towards enabling complete mechanization of the assembly process.

The mechanization of the assembly process is further promoted when the core parts are composed of laminations which are welded together. Moreover, the occurrence of glue residues which might influence the accuracy of the track location and/or the track width is avoided.

The assembled core supports which are welded together, magnet cores and screening plate may be mounted in a metal housing which has an aperture through which the ends of the core parts which define the transducing gaps project. For a good electrical contact of the screening plate with the housing (which after assembly in an apparatus is connected to ground), the screening plate may have a lug which projects beyond the core supports. The assembly of core supports, magnet cores and screening plate may be embedded in a moulding composition within the housing.

One of the core supports may project beyond the housing on the side opposite to the aperture. The part of the core support projecting beyond the housing may then comprise previously provided references, in particular a plane which lies in one plane with the transducing gaps (azimuth reference), a line which is parallel to the lower side of the transducing gaps (gap height reference), and a plane which is used in aligning the jig prior to connecting the core parts (track location reference). It is particularly useful if, after the head components have been moulded in the housing, an external gap height reference is available upon grinding the tape contact face and an external azimuth reference is available upon assembling the head in an apparatus. This latter provides the possibility of assembling the head against a fixed azimuth reference plane of the apparatus so that azimuth adjustment need not take place.

The present invention also relates to a method of manufacturing a multitrack magnetic head. A method according to the invention includes the steps of positioning a first set of core parts on a first base plate by means of a jig and then securing (e.g. welding) the first set of core parts to the first base plate, positioning a second set of core parts on a second base plate by means of a jig and then securing the second set of core parts to the second base plate, arranging the base plates such that the first and the second sets of core parts face each other, placing a screening plate between and transverse to major portions of the base plates, pressing the major portions against opposite edges of the screening plate including bringing a resilient lug which forms a part of either the first or the second base plate into contact with one of the opposite edges of the screening plate, and then securing the major portions of the base plates directly to the opposite edges of the screening plate while maintaining the major portions under pressure.

BRIEF DESCRIPTION OF THE DRAWING

An embodiment of the invention will now be described, by way of example, with reference to the accompanying drawings, in which:

FIG. 1 is a perspective view showing a known multitrack magnetic head construction, FIG. 2 is a perspective view showing a core part suitable for use in the magnetic head according to the invention and which consists of laminations which are welded together, FIG. 3 is a perspective view showing a first base plate on which two core parts of the type of FIG. 2 are secured, FIG. 4 is a perspective view showing a second base plate on which two further core parts of the FIG. 2 type are connected.

DESCRIPTION OF THE PREFERRED EMBODIMENTS

Figure 5:
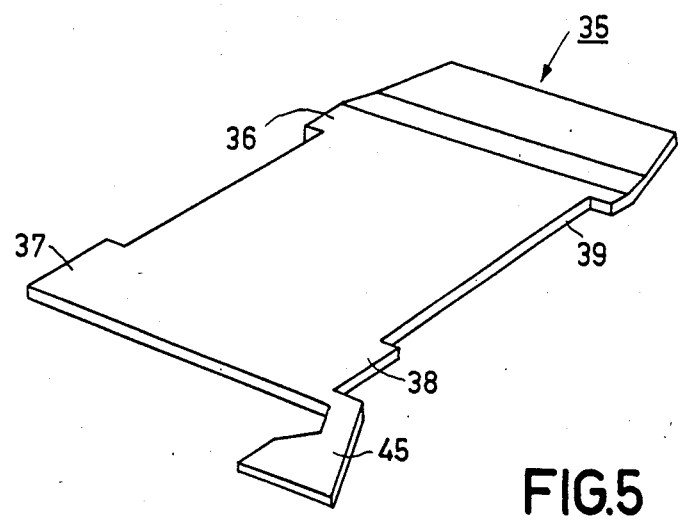
FIG. 5 is a perspctive view showing a screening plate which also serves to connect the base plates of FIGS. 3 and 4 together.

FIG. 1 shows a known magnetic head construction in which magnet cores 2 with transducing gaps 3 are embedded in a bipartite box 1. The box halves are connected together by welding a screening plate 4 of a metallic soft magnetic material placed between the magnet cores 2 to the front of the box 1 at points 6 and, 7 (and, if desired, to the rear at points 8, 9). It is clearly visible that welds are present in front face 5 of the construction.

The embodiment of the invention described hereinafter provides an improved head construction which is based on the use of flat base plates as core supports instead of box halves and on welding the screening plate thereto at its edges. In order to improve the mechanization of the assembly process, it is advantageous to construct the core parts from separate laminations welded together by means of laser welding. The core parts are then welded to the respective base plates.

FIG. 2 shows such a core part 12 which is built up from four laminations 13 by means of laser welding at the points A, B and C. The welding depth is at most 0.1 mm so that the properties of the material of the laminations is influenced as little as possible.

The laminations 13 are provided with abutments 14 with which they can be welded to a base plate in a defined position and orientation. FIG. 3 shows a first base plate 16 on which two core parts 17 and 18 of the type shown in FIG. 2 have been welded after having been accurately positioned by means of a jig (not shown). The laminations comprise extra studs 15 on their upper sides to enable the core parts 17 and 18 to be welded together at a point D so as to improve the stability in a subsequent grinding process of the gap faces 20, 20' and 21, 21'. The base plate 16 comprises a substantially flat major portion connected to upright side edges 22, 23 terminating into bosses 24, 25 which are also ground during the grinding process of the gap faces so that they become located in one plane with the gap faces and may serve as reference faces. Along the lower side of the gap faces 20, 20', material is ground away parallel to a line 26 joining the reference faces 24, 25 so that inclined surfaces 27 are formed; see FIG. 2. The lower side of the gap faces 20, 20' denoted by a line 28, hence, becomes located at a fixed distance from and parallel to the reference line 26.

Figure 8:
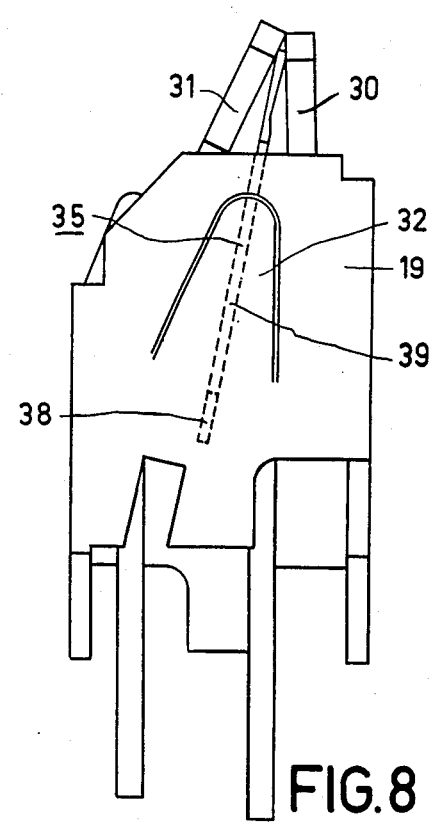

FIGS. 4 and 8 show a base plate 19 which comprises a punched lug 32 which is forced inwardly in the direction of the core parts 30 and 31.

Figure 6:
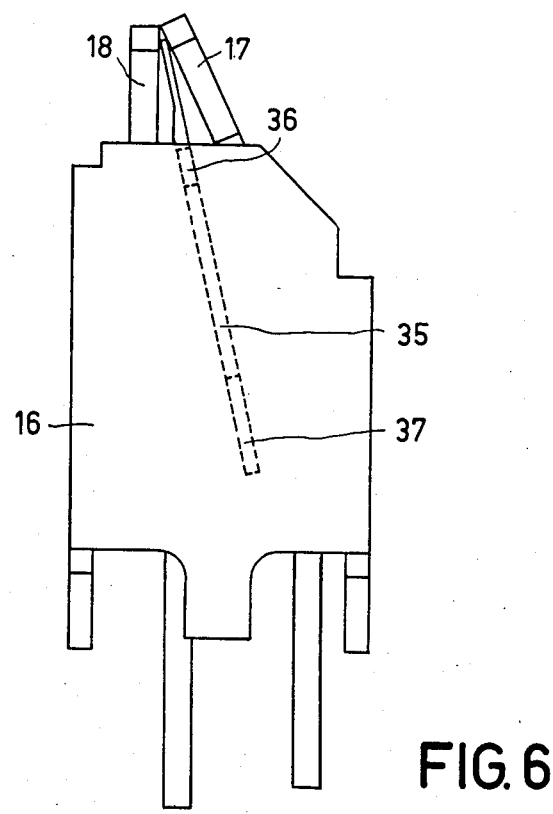
FIGS. 6, 7 and 8 are a left-side elevation, a front elevation and a right-side elevation, respectively, of an assembly of base plates, screening plate and core parts for a magnetic head according to the invention.
Figure 7:
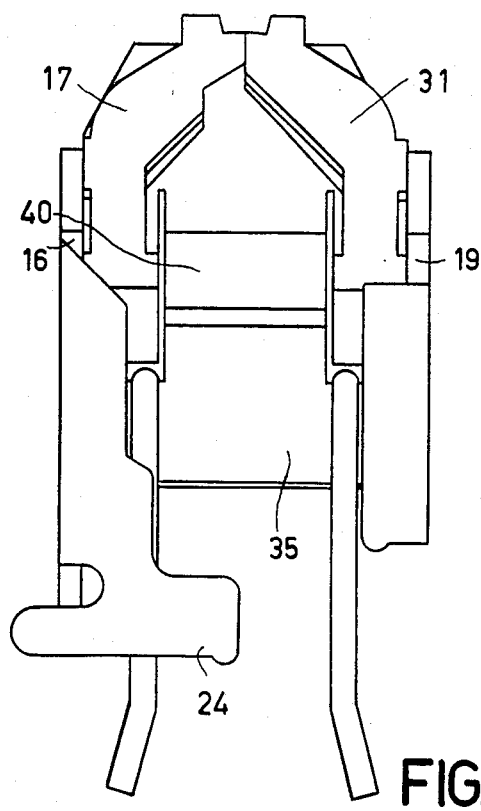

FIG. 5 shows a screening plate 35 of a soft magnetic material (for example a nickel-iron alloy) which is welded directly to base plate 16 via abutting surfaces 36, 37 (FIG. 6) and is welded directly to base plate 19 and lug 32, respectively, via stud 38 and face 39 (FIG. 8). Upon welding, the base plates are forced towards each other against the spring action of lug 32. Prior to combining the base plates, non-magnetic spacers in the form of thin layers are first deposited on the gap faces 20, 20' (and possibly also 33, 33') and cores 40, 41 have been slid on the core parts. FIG. 7 shows the situation during the pressing step.

Figure 9:
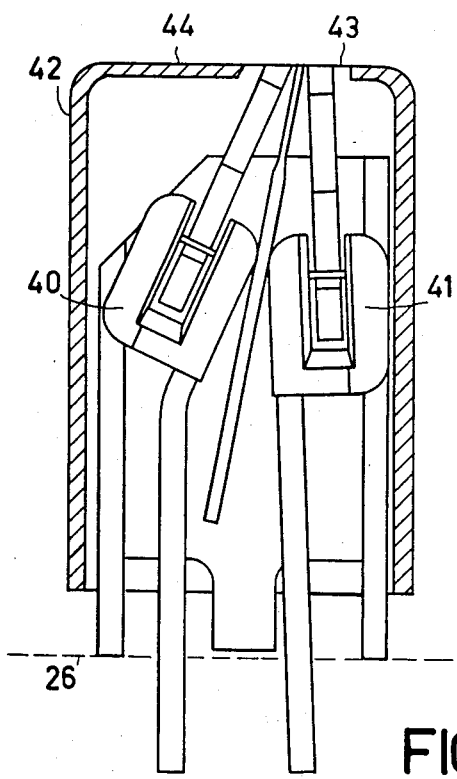
FIGS. 9 and 10 are cross-sectional views through a housing in which the assembly shown in FIGS. 6, 7 and 8 is provided.
Figure 10:
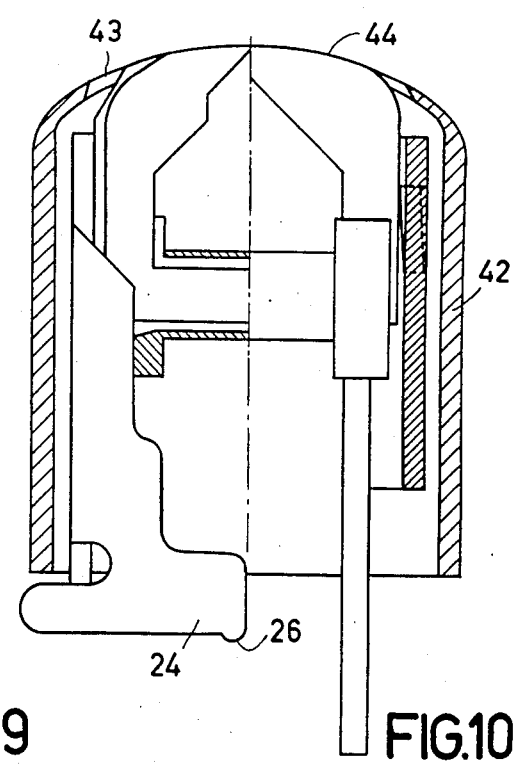

FIG. 9 is a cross-sectional view taken along the gap faces through the assembly of FIG. 7 after it has been moulded in a soft magnetic housing 42 by means of a synthetic resin. The ends of the core parts and of the screening plate project through an aperture 43.

Tape contact face 44 has been ground to a desired gap depth. The line (26) serves as a reference. In order to be able to provide the screening plate readily between the core parts up to the tape contact face and, nevertheless, to obtain a good screening effect, the part of the screening plate which projects beyond the base plates is thinner than the part therewithin. Furthermore, the screening plate has a projecting lug 45 to ensure electric contact with the housing.

FIG. 9 is partly an elevational and partly a cross-sectional view at right angles to the gap faces of the FIG. 7 assembly provided in housing 42.

What is claimed is:

1. A method of manufacturing a magnetic head, comprising:
   providing a first base plate having a first major portion;
   providing a second base plate having a second major portion having a resilient lug extending from a flat surface thereof;
   providing a screening plate;

positioning a first set of core parts on the first major portion;

securing the first set of core parts to the first major portion;

positioning a second set of core parts on the second major portion;

securing the second set of core parts to the second major portion;

arranging the base plates such that the first set of core parts faces the second set of core parts;

placing the screening plate between and transverse to the first and the second major portions of the base plates;

pressing the first and the second major portions against the screening plate including bringing the resilient lug into contact with the screening plate; and securing the first and the second major portions directly to the screening plate.

2. A method as claimed in claim 1, wherein the screening plate includes a soft magnetic material.

3. A method as claimed in claim 2, wherein the soft magnetic material is a nickel-iron alloy.

4. A method as claimed in claim 2, wherein the screening plate includes at least two parts of the soft magnetic material, one part being thinner than the other part.

5. A method as claimed in claim 1, wherein the first base plate further includes upright edges connected to the first major portion, the upright edges terminating into bosses.

6. A method of manufacturing a multitrack magnetic head, comprising:

providing a first base plate having a first major portion;

providing a second base plate having a second major portion having a resilient lug extending from a surface of the second major portion;

providing a screening plate having opposite edges;

positioning a first set of core parts on the first major portion;

welding the first set of core parts to the first major portion;

positioning a second set of core parts on the second major portion;

welding the second set of core parts to the second major portion;

arranging the base plates such that the first set of core parts faces the second set of core parts;

disposing the screening plate between the first and the second major portions and arranging the screening plate such that the opposite edges face the first and the second major portions;

pressing the first and the second major portions against the opposite edges of the screening plate including bringing the resilient lug of the second major portion into contact with one of the opposite edges of the screening plate, and further including pressing the second major portion against a pressure of the resilient lug, so that the first and the second major portions of the base plates are adjacent to the opposite edges of the screening plate; and welding the first and the second major portions directly to the opposite edges of the screening plate while maintaining the first and the second major portions adjacent to the opposite edges.

7. A method as claimed in claim 6, further comprising the step of welding laminations together to form the first set and the second set of core parts.

8. A method as claimed in claim 6, wherein the first base plate includes a Cr-Ni steel.

9. A method as claimed in claim 8, wherein the second base plate includes a Cr-Ni steel.

* * * * *